(12) United States Patent
Yamaoka et al.

(10) Patent No.: US 11,702,093 B2
(45) Date of Patent: Jul. 18, 2023

(54) DISPLAY CONTROL DEVICE

(71) Applicant: TOYOTA JIDOSHA KABUSHIKI KAISHA, Toyota (JP)

(72) Inventors: Masaaki Yamaoka, Tokyo-to (JP); Naotoshi Kadotani, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 17/191,360

(22) Filed: Mar. 3, 2021

(65) Prior Publication Data
US 2021/0276583 A1   Sep. 9, 2021

(30) Foreign Application Priority Data

Mar. 3, 2020 (JP) ................. 2020-036222

(51) Int. Cl.
*B60W 50/14* (2020.01)
*G09G 5/38* (2006.01)
*B60W 60/00* (2020.01)

(52) U.S. Cl.
CPC .......... *B60W 50/14* (2013.01); *B60W 60/001* (2020.02); *G09G 5/38* (2013.01); *B60W 2050/146* (2013.01); *B60W 2520/10* (2013.01); *B60W 2540/10* (2013.01); *B60W 2554/4042* (2020.02); *B60W 2554/80* (2020.02); *G09G 2380/10* (2013.01)

(58) Field of Classification Search
None
See application file for complete search history.

(56) References Cited

U.S. PATENT DOCUMENTS

| | | |
|---|---|---|
| 11,320,292 B2 | 5/2022 | Okuji et al. |
| 2002/0062189 A1 | 5/2002 | Kannonji |
| 2009/0251304 A1 | 10/2009 | Saito et al. |
| 2009/0288636 A1 | 11/2009 | Saito et al. |
| 2011/0015819 A1* | 1/2011 | Goto ................ B60T 1/10 |
| | | 701/31.4 |
| 2016/0251015 A1 | 9/2016 | Sakaguchi |

(Continued)

FOREIGN PATENT DOCUMENTS

| JP | 2002-163798 A | 6/2002 |
|---|---|---|
| JP | 2005-053401 A | 3/2005 |

(Continued)

OTHER PUBLICATIONS

Sep. 6, 2022 Office Action issued in U.S. Appl. No. 17/215,018.

(Continued)

*Primary Examiner* — Hunter B Lonsberry
*Assistant Examiner* — Paysun Wu
(74) *Attorney, Agent, or Firm* — Oliff PLC

(57) ABSTRACT

A display control device comprising: a depression acquisition part acquiring a current amount of depression of an accelerator pedal; a suitable range calculation part calculating, as a suitable depression range, a range of an amount of accelerator depression required for a following distance of a preceding vehicle and an ego vehicle to become a predetermined target following distance, based on the following distance; and a display control part displaying the current amount of depression and the suitable depression range at a display device able to be viewed by a driver.

8 Claims, 8 Drawing Sheets

(56) References Cited

U.S. PATENT DOCUMENTS

2017/0253240 A1  9/2017  Kishida
2021/0323569 A1  10/2021  Yamaoka

FOREIGN PATENT DOCUMENTS

| | | |
|---|---|---|
| JP | 2006-163501 A | 6/2006 |
| JP | 2008-174150 A | 7/2008 |
| JP | 2008-265407 A | 11/2008 |
| JP | 2012-18566 A | 1/2012 |
| JP | 2014-240233 A | 12/2014 |
| JP | 2016-159708 A | 9/2016 |
| JP | 2017-154657 A | 9/2017 |
| JP | 2018-203180 A | 12/2018 |

OTHER PUBLICATIONS

Dec. 20, 2022 Office Action issued in U.S. Appl. No. 17/215,018.
Apr. 5, 2023 Notice of Allowance issued in U.S. Appl. No. 17/215,018.

* cited by examiner

DISPLAY CONTROL DEVICE

FIELD

The present disclosure relates to a display control device.

BACKGROUND

In the past, a display control device has been proposed which displays information relating to a following distance between a preceding vehicle and an ego vehicle, on a display able to be viewed by the driver (for example, PTLs 1 to 3).

For example, in PTL 1, it is proposed to calculate a suitable following distance between a preceding vehicle and the ego vehicle, and display on a head-up display two marks changing in distance between them in accordance with a degree of discrepancy between an actual following distance and the suitable following distance.

CITATIONS LIST

Patent Literature

[PTL 1] Japanese Unexamined Patent Publication No. 2006-163501
[PTL 2] Japanese Unexamined Patent Publication No. 2002-163798
[PTL 3] Japanese Unexamined Patent Publication No. 2012-18566

SUMMARY

In this regard, depending on a level of driving skill of a driver, even if the driver obtains a grasp of an extent by which the actual following distance between a preceding vehicle and the ego vehicle diverges from the suitable following distance, the driver cannot obtain a grasp of the suitable amount of accelerator depression for making the actual following distance approach the suitable following distance. As a result, depending on the driver, even if the actual following distance and the suitable following distance between a preceding vehicle and the ego vehicle are displayed on the head-up display, sometimes it is not possible to maintain the actual following distance between a preceding vehicle and the ego vehicle at the suitable following distance.

In consideration of the above problem, an object of the present disclosure is to provide a display control device enabling a driver to obtain a grasp of the amount of accelerator depression required for suitably maintaining the following distance between a preceding vehicle and the ego vehicle.

The present invention was made so as to solve the above problem and has as its gist the following.

(1) A display control device comprising:
a depression acquisition part acquiring a current amount of depression of an accelerator pedal;
a suitable range calculation part calculating, as a suitable depression range, a range of an amount of accelerator depression required for a following distance of a preceding vehicle and an ego vehicle to become a predetermined target following distance, based on the following distance; and
a display control part displaying the current amount of depression and the suitable depression range at a display device able to be viewed by a driver.

(2) The display control device according to above (1), wherein the suitable range calculation part calculates a width of the suitable depression range, based on at least one of the following distance between a preceding vehicle and the ego vehicle, a speed difference between a preceding vehicle and the ego vehicle, and a speed of the ego vehicle.

(3) The display control device according to above (1) or (2), wherein the suitable range calculation part makes the width of the suitable depression range narrower when the following distance between a preceding vehicle and the ego vehicle is relatively short, compared to when it is relatively long.

(4) The display control device according to any one of above (1) to (3), wherein the suitable range calculation part makes the width of the suitable depression range narrower when the speed difference between a preceding vehicle and the ego vehicle is relatively large, compared to when it is relatively small.

(5) The display control device according to any one of above (1) to (4), wherein the suitable range calculation part makes the width of the suitable depression range narrower when the speed of the ego vehicle is faster than a predetermined upper reference speed, compared to when the speed of the ego vehicle is equal to or less than an upper reference speed.

(6) The display control device according to any one of above (1) to (5), wherein the suitable range calculation part makes the width of the suitable depression range narrower when the speed of the ego vehicle is slower than a predetermined lower reference speed, compared to when the speed of the ego vehicle is equal to or greater than the lower reference speed.

(7) The display control device according to any one of above (1) to (6), wherein
the suitable range calculation part calculates the suitable depression range based on the upper limit speed, if the speed of the ego vehicle exceeds a predetermined upper limit speed or if the speed of the ego vehicle is expected to exceed a predetermined upper limit speed when the accelerator pedal is depressed by an amount of accelerator depression in a suitable depression range calculated based on the following distance between a preceding vehicle and the ego vehicle, and
the display control part changes the mode of display of the suitable depression range on the display device between when the suitable depression range is calculated based on the following distance and when it is calculated based on the upper limit speed.

(8) The display control device according to any one of above (1) to (7), wherein
the suitable range calculation part calculates the optimum amount of accelerator depression for the following distance between a preceding vehicle and the ego vehicle to become the target following distance, based on the following distance, and
the display control part makes the display device display the current amount of accelerator depression, the optimum amount of accelerator depression, and the suitable depression range.

(9) The display control device according to above (8), wherein the display control part displays the optimum amount of accelerator depression at a position different from the center of the suitable depression range.

According to the present disclosure, a display control device enabling a driver to obtain a grasp of the amount of accelerator depression required for suitably maintaining the following distance between a preceding vehicle and the ego vehicle is provided.

DESCRIPTION OF EMBODIMENTS

Figure 1:
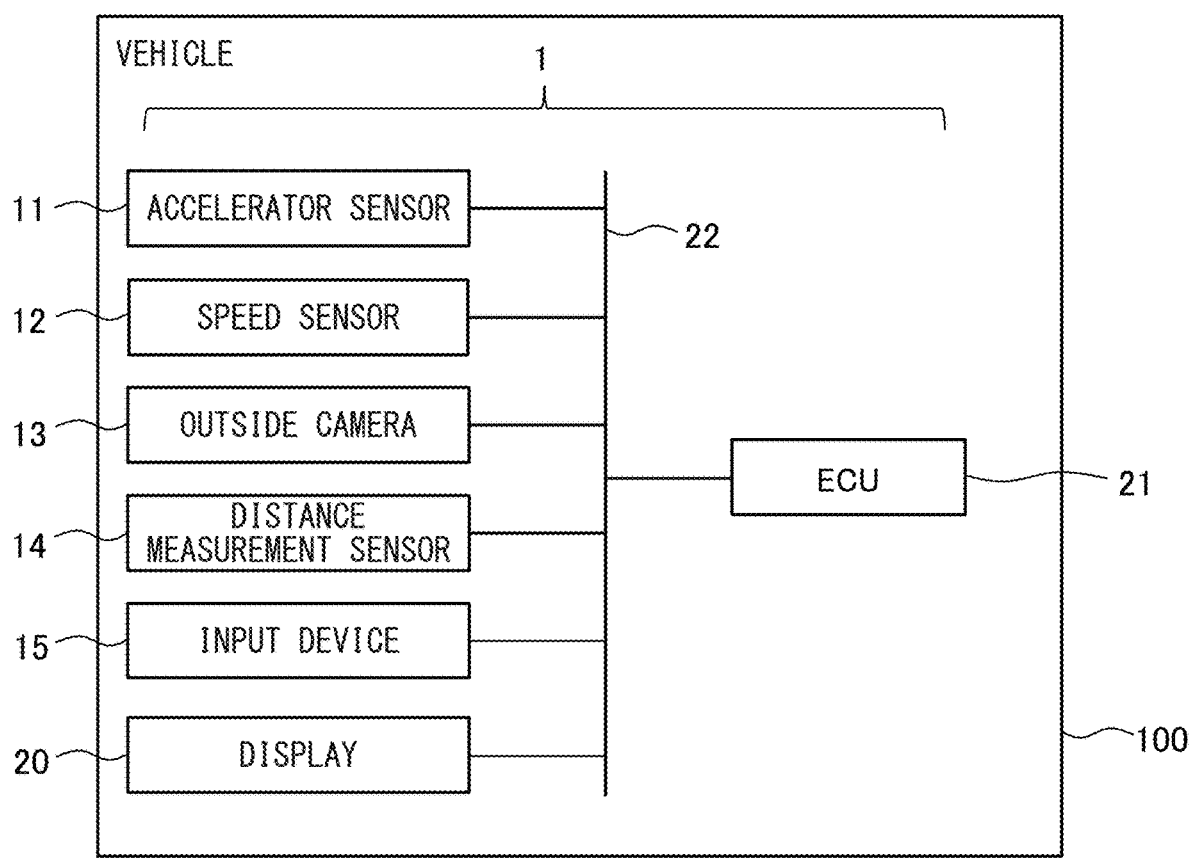
FIG. 1 is a view of the configuration schematically showing a display system.

Below, embodiments will be explained in detail while referring to the drawings. Note that, in the following explanation, similar component elements will be assigned the same reference notations.

Configuration of Display System

FIG. 1 is a view of the configuration schematically showing a display system in which a display control device according to one embodiment is mounted. The display system 1 is mounted in a vehicle 100 and displays various information at a display. In the present embodiment, the display system 1 has an accelerator sensor 11, speed sensor 12, outside camera 13, distance measurement sensor 14, input device 15, display 20, and electronic control unit (below, referred to as an "ECU") 21.

However, the display system 1 need not necessarily have all of these. For example, if the display system 1 has the outside camera 13, it need not necessarily have the distance measurement sensor 14.

The accelerator sensor 11, speed sensor 12, outside camera 13, distance measurement sensor 14, input device 15, display 20, and ECU 21 are connected to be able to communicate through an inside network 22. The inside network 22 is a network based on the CAN (Controller Area Network) or other standard.

The accelerator sensor 11 is a sensor detecting an amount of depression by the driver of an accelerator pedal (not shown) of the vehicle 100. The accelerator sensor 11 is attached to the accelerator pedal and outputs a signal corresponding to the amount of depression of the accelerator pedal by the driver (below, referred to as the "amount of accelerator depression"). The output voltage of the accelerator sensor 11 is output to the ECU 21 through the inside network 22.

The speed sensor 12 is a sensor detecting a speed of the vehicle 100. For example, it detects a rotational speed of a drive shaft of the vehicle 100 and detects a speed of the vehicle 100 based on the detected rotational speed. The output signal of the speed sensor 12 is output through the inside network 22 to the ECU 21.

The outside camera 13 is a device capturing an image of the surroundings of the vehicle. The outside camera 13 has 2D detectors (CCD, C-MOS, etc.) configuring an array of photoelectric conversion elements having sensitivity to visible light, and an image-forming optical system forming an image of a region for capture on the 2D detectors. In the present embodiment, the outside camera 13 is for example attached to the inside of the vehicle 100 so as to face the front of the vehicle 100. The outside camera 13 captures an image of the area in front of the vehicle 100 at every predetermined image capturing period (for example 1/30 second to 1/10 second), and generates an image in which front area is captured. The outside camera 13 outputs a generated image through the inside network 22 to the ECU 21 every time generating an image. Note that, the outside camera 13 may be a single lens camera or a stereo camera. If a stereo camera is used as the outside camera 13, the outside camera 13 functions as the distance measurement sensor 14. The vehicle 100 may also be provided with a plurality of outside cameras different in directions of capture or focal distances.

The distance measurement sensor 14 is a sensor measuring the distance to an object present in the surroundings of the vehicle 100. In the present embodiment, the distance measurement sensor 14 can also measure the orientation of the object present in the surroundings of the vehicle 100. The distance measurement sensor 14 is, for example, a milliwave radar or other radar or LIDAR. Further, the distance measurement sensor 14 may also be configured to measure the relative speed of the object present in the surroundings of the vehicle. In the present embodiment, the distance measurement sensor 14 measures the distance to the object present in front of the vehicle. The distance measurement sensor 14 outputs the results of measurement of the distance to the object in the surroundings to the ECU 21 through the inside network 22, every predetermined period.

The input device 15 is a device receiving input from the driver and other passengers. Specifically, the input device 15 has a touch panel, switches, buttons, and a remote control. At the input device 15, for example, the setting relating to the suitable following distance between a preceding vehicle and the ego vehicle is input. The input device 15 outputs the received input through the inside network 22 to the ECU 21. The input device 15, for example, is provided at the instrument panel.

The display 20 is a display device displaying information relating to the vehicle 100 or the operation of the vehicle 100. The display 20, for example, is a liquid crystal display or organic EL display or other device displaying an image on a screen. Alternatively, the display 20 may be a head-up display projecting an image on the front window glass of the vehicle 100 or another transparent plate provided at the front of the driver. Whatever the case, the display 20 may be any type of display so long as able to display an image. The display 20 is connected through the inside network 22 to the ECU 21. The display 20 receives a display signal from the ECU 21, and displays an image corresponding to the received display signal.

Figure 2:
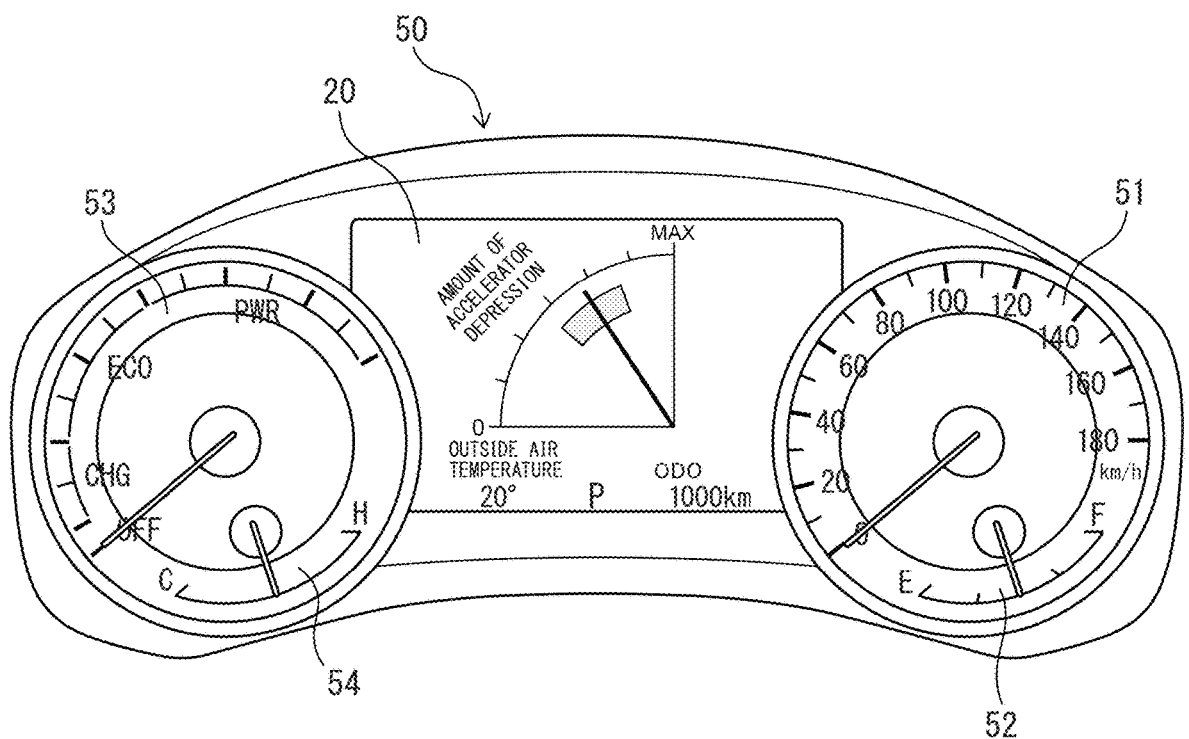
FIG. 2 is a view schematically showing an instrument panel provided inside a vehicle.

FIG. 2 is a view schematically showing an instrument panel 50 provided inside the vehicle 100. The instrument panel 50 shown in FIG. 2 is arranged so as to be positioned at the front of the driver inside the vehicle 100.

As shown in FIG. 2, the instrument panel 50 is provided with a speedometer 51 displaying a speed, a fuel gauge 52 displaying a remaining amount of fuel, a hybrid system indicator 53 showing an output of a hybrid system and a power regeneration level, and a water temperature gauge 54 showing a cooling water temperature of an internal combustion engine. In addition, the instrument panel 50 is provided with a display 20 among these speedometer 51, fuel gauge 52, hybrid system indicator 53, and water temperature gauge 54. At the display 20, various types of warning lights and various other information are displayed in addition to the information relating to the amount of accelerator depression explained later.

Figure 3:
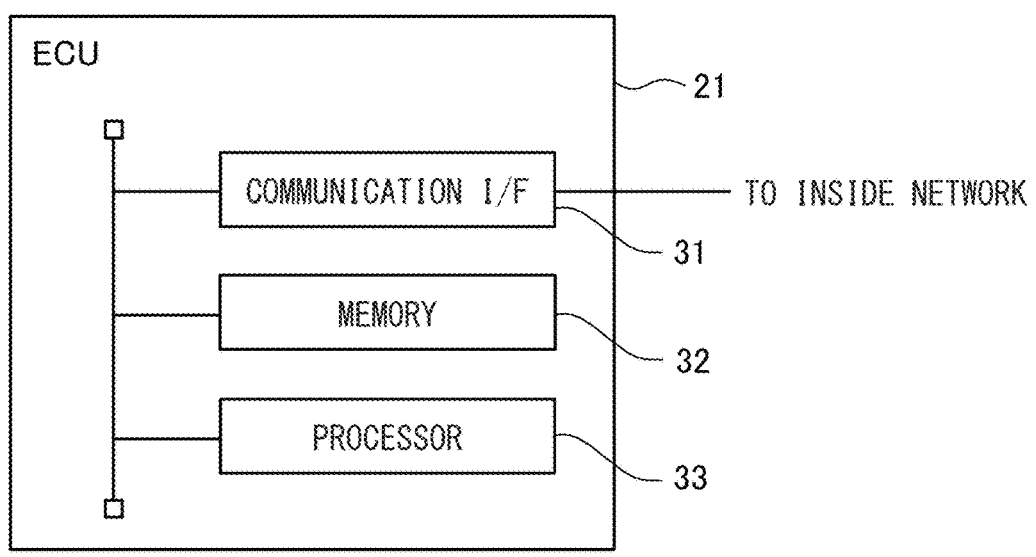
FIG. 3 is a view of a hardware configuration of an ECU 21 of one embodiment of the display control device.

FIG. 3 is a view of the configuration of the ECU 21 of one embodiment of the display control device. The ECU 21 has a communication interface 31, memory 32, and processor 33. Note that, the communication interface 31, memory 32, and processor 33 may be separate circuits or may be configured as a single integrated circuit.

The communication interface 31 has a communication interface circuit and an equipment interface circuit. The communication interface circuit is a circuit for connecting the ECU 21 to an inside network 22. The equipment interface circuit is a circuit for outputting the display signal to the display 20.

The communication interface 31 sends a signal, received from the accelerator sensor 11, corresponding to the amount of depression of the accelerator to the processor 33. Further, the communication interface 31 sends a signal showing the speed of the vehicle 100 received from the speed sensor 12, to the processor 33. In addition, the communication interface 31 sends an image received from the outside camera 13, to the processor 33, each time receiving an image. The communication interface 31 sends the result of measurement of the distance to an object in the surroundings of the vehicle from the distance measurement sensor 14, to the processor 33, each time receiving the results of measurement. In addition, the communication interface 31 sends an input signal of a passenger from the input device 15, to the processor 33, each time receiving that input signal. In addition, the communication interface 31 sends to the display 20 a display signal for the display 20 received from the ECU 21, every time receiving a display signal.

The memory 32 is a storage device storing data. The memory 32, for example, has a volatile semiconductor memory and nonvolatile semiconductor memory. The memory 32 stores a program of driver assistance processing to be performed by the processor 33 of the ECU 21. Further, the memory 32 stores images captured by the outside camera 13, the speed of the vehicle 100, results of measurement of the distance to an object in the surroundings of the vehicle, input information of the passengers, different types of data used in the display processing, etc.

The processor 33 has one or more CPUs (central processing units) and their peripheral circuits. The processor 33 may further have other processing circuits such as logical processing units or numerical processing units. The processor 33 performs processing for display of the display 20 to control the display at the display 20.

Display Operation

Figure 4:
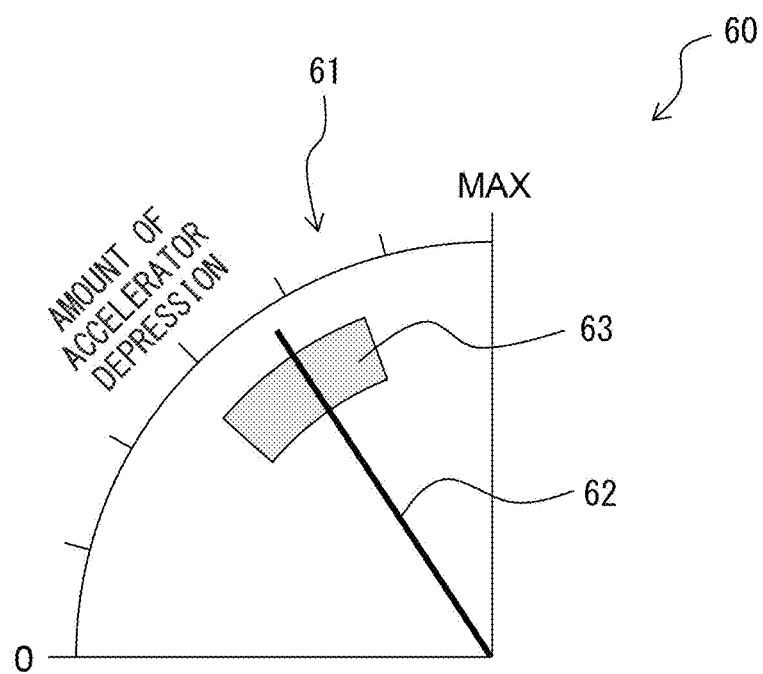
FIG. 4 is a view schematically showing an image displayed at part of the display.

FIG. 4 is a view schematically showing the display shown at part of the display 20. As will be understood from FIG. 4, at the display 20, a display object 60 relating to the amount of accelerator depression is shown. In the present embodiment, the display object 60 is the image shown on the display 20. The display object 60 may be shown on the display 20 at all times when the vehicle 100 is being driven, or may be shown only when selected by the driver.

As shown in FIG. 4, the display object 60 shown at part of the display 20 includes an indicator 61, a needle 62, and a suitable depression range display 63.

The indicator 61 shows an indicator of the amount of accelerator depression. In the example shown in FIG. 4, the indicator 61 has a scale showing the amount of accelerator depression at equal intervals along an arc from zero to the maximum value (MAX). The driver can obtain a grasp of the current amount of accelerator depression based on the position of the needle 62 with respect to the indicator 61.

The needle 62 shows the current amount of accelerator depression. In the example shown in FIG. 4, the needle 62 is shown as pivoting about the center of the arc of the indicator 61. In particular, the needle 62 pivots from a position of the indicator 61 facing zero to a position facing MAX. The needle 62 is made to pivot so as to point to the current amount of accelerator depression.

The current amount of accelerator depression is detected by the accelerator sensor 11. Therefore, the needle 62 is made to pivot so as to indicate the amount of accelerator depression detected by the accelerator sensor 11.

The suitable depression range display 63 shows the range of the suitable amount of accelerator depression based on the current running state of the vehicle 100. As shown in FIG. 4, the suitable depression range display 63 is shown as an arc of a length in the circumferential direction shorter than the arc of the indicator 61.

In the present embodiment, the range of the suitable amount of depression corresponding to the suitable depression range display 63 (below, referred to as the "suitable depression range") is specified, based on the optimum amount of accelerator depression based on the current running state of the vehicle 100 and the width of the suitable depression range based on the current running state of the vehicle 100. In particular, in the present embodiment, the suitable depression range is set so that the optimum amount of accelerator depression based on the current running state of the vehicle 100 becomes a center value of the suitable depression range.

The optimum amount of accelerator depression, in the present embodiment, is set based on the following distance with a preceding vehicle running in front of the vehicle (ego vehicle) 100 in the same lane as the vehicle 100 and the upper limit speed set by the driver. The upper limit speed is, for example, input by the driver by the input device 15.

In the present embodiment, if the current speed of the vehicle 100 is faster than the upper limit speed, the optimum amount of accelerator depression is calculated based on the upper limit speed. Specifically, regarding the optimum amount of accelerator depression, the acceleration (deceleration) giving a speed of the vehicle 100 becoming the upper limit speed after the elapse of a predetermined time (for example, 3 seconds) is calculated. This acceleration is calculated, for example, by dividing the speed difference between the current speed of the vehicle 100 and the upper limit speed by the above predetermined time. Further, the amount of accelerator depression giving the calculated acceleration is calculated as the optimum amount of accelerator depression. Note that, if the current speed of the vehicle 100 is faster than the upper limit speed, the optimum amount of accelerator depression may be set in any way so long as the speed of the vehicle 100 changes so as to approach the upper limit speed.

On the other hand, if the current speed of the vehicle 100 is equal to or less than the upper limit speed, the optimum amount of accelerator depression is calculated based on the following distance between the vehicle 100 and a preceding vehicle. Specifically, first, the actual following distance between the vehicle 100 and a preceding vehicle is calculated based on the information of the outside camera 13 or distance measurement sensor 14. In addition, the target following distance is calculated based on the speed of the vehicle 100 or the setting by the driver. Further, the acceleration is calculated so that the difference between the target following distance and the actual following distance becomes zero after the elapse of a predetermined time (for example, 3 seconds). This acceleration "a", for example, is calculated by the following formula (1) assuming the vehicle 100 is being driven at an equal acceleration:

$$a = 2 \cdot (\Delta D - \Delta V \cdot t)/t^2 \qquad (1)$$

In the formula (1), ΔD indicates the difference between the target following distance and the actual following distance, ΔV indicates the speed difference between the vehicle 100 and a preceding vehicle, and "t" indicates the target time until the actual following distance reaches the target following distance (corresponding to the above predetermined time). Note that, if the current speed of the vehicle 100 is equal to or less than the upper limit speed, the optimum amount of accelerator depression may be set in any way so long as changing so that the following distance between the vehicle 100 and a preceding vehicle approaches the target following distance.

The target following distance is set based on at least one of the speed of the vehicle 100 and setting by the driver and other parameters. The target following distance is set so as to become longer as the speed of the vehicle 100 becomes faster. In this case, the target following distance may be set so as to change continuously in accordance with the speed of the vehicle 100, or may be set so as to change in steps in accordance with the speed of the vehicle 100. Further, the target following distance is set in stages by the driver (for example, short distance, medium distance, and long distance). For example, if the speed of the vehicle 100 is 80 km/h, when the following distance is set by the driver to a "short distance", the target following distance is set to 25 m, when a "medium distance", the target following distance is set to 33 m, and when a "long distance", the target following distance is set to 47 m. Note that, the target following distance may also be a predetermined constant distance without regard as to the speed of the vehicle 100 and the setting by the driver etc.

The width of the suitable depression range, in the present embodiment, is calculated based on at least one of the following distance of the vehicle 100 and a preceding vehicle, the speed difference between the vehicle 100 and a preceding vehicle, and the speed of the vehicle 100. The width of the suitable depression range is calculated, for example, by finding in advance a table or calculation formula having the following distance with a preceding vehicle, the speed difference with a preceding vehicle, and the speed of the vehicle 100 as arguments, and calculating the width of the suitable depression range based on the table or calculation formula and the values of these parameters at the time of use.

Specifically, when the following distance between the vehicle 100 and a preceding vehicle is relatively short, compared to when it is relatively long, the width of the suitable depression range is set narrow. More specifically, the shorter the following distance between the vehicle 100 and a preceding vehicle, the shorter the width of the suitable depression range is set to. This is because the shorter the following distance between the vehicle 100 and a preceding vehicle, the more severe the driving that is sought.

Further, when the speed difference of the vehicle 100 and a preceding vehicle is relatively large, compared to when it is relatively small, the width of the range of the amount of depression is set narrower. More specifically, the larger the speed difference between the vehicle 100 and a preceding vehicle, the shorter the width of the suitable depression range is set to. This is because the larger the speed difference between the vehicle 100 and a preceding vehicle, the more the divergence of the amount of accelerator depression from the optimum amount affects the following distance between the vehicle 100 and a preceding vehicle.

Further, when the speed of the vehicle 100 is faster than a predetermined upper reference speed, compared to when the speed of the vehicle 100 is equal to or less than the upper reference speed, the width of the suitable depression range is set narrower. The upper reference speed is, for example, set to a speed slower than the upper limit speed. When the speed of the vehicle 100 is extremely fast, the distance of movement per unit time is long, therefore precise speed control is necessary. In such a case, the speed of the vehicle 100 can be strictly controlled.

In addition, when the speed of the vehicle 100 is slower than a predetermined lower reference speed, compared to when it is equal to or greater than the upper reference speed of the vehicle 100, the width of the suitable depression range is set narrower. The lower reference speed is set to a speed slower than the upper reference speed. When the speed of the vehicle 100 is extremely slow, a slight change of the amount of accelerator depression sometimes causes a large change in the speed of the vehicle 100. In such a case, it is possible to strictly control the speed of the vehicle 100.

Furthermore, when the optimum amount of accelerator depression is relatively large, compared to when the optimum amount of accelerator depression is relatively small, the width of the suitable depression range may be set broader. More specifically, the larger the optimum amount of accelerator depression, the broader the width of the suitable depression range is set to. Here, in general, in the vehicle 100 using an internal combustion engine, the larger the amount of accelerator depression, the smaller the change in acceleration of the vehicle 100 with respect to a change in the amount of accelerator depression. Therefore, by setting the width of the suitable depression range based on the amount of accelerator depression in this way, it is possible to maintain the width of the acceleration of the vehicle 100 with respect to the width of the suitable depression range at the same degree.

Note that, the display object 60 relating to the amount of accelerator depression, in the above embodiment, is configured so that the needle 62 pivots inside an arc shaped indicator 61 so as to enable the current amount of accelerator depression, etc., to be grasped by the driver. However, the display object 60, for example, may also be configured so that the needle 62 is fixed and in that state the indicator 61 turns in the circumferential direction so as to enable the current amount of accelerator depression, etc., to be grasped by the driver. Further, the display object 60, for example, may also be configured so that the needle 62 slides straight along a straight shaped indicator 61 so as to enable the current amount of accelerator depression, etc., to be grasped by the driver.

Further, in the above embodiment, the display object 60 relating to the amount of accelerator depression is an image shown on the display 20. However, the display object 60 does not necessarily have to be an image. For example, the indicator 61 and needle 62, like the speedometer 51, etc., may be formed by a fixed scale and a physical needle. Further, the suitable depression range display 63, for example, may be configured from a plurality of LED lights and may be formed so that by changing the LED lights to be lit up, the range can be changed. Whatever the case, so long as possible to display the current amount of accelerator depression and suitable depression range, instead of the display 20, any display device able to be viewed by the driver may be used.

Furthermore, in the above embodiment, if the current speed of the vehicle 100 is faster than the upper limit speed, the optimum amount of accelerator depression is calculated based on the upper limit speed. However, even if the current speed of the vehicle 100 does not reach the upper limit speed, if expected to reach the upper limit speed, the optimum amount of accelerator depression may be calculated based on the upper limit speed. In particular, when the speed of the vehicle 100 is expected to exceed the preset upper limit speed if the accelerator pedal is depressed by the amount of accelerator depression in the suitable depression range calculated based on the following distance of the vehicle 100 and a preceding vehicle, the optimum amount of accelerator depression is calculated based on the upper limit speed.

Display Processing

Figure 5:
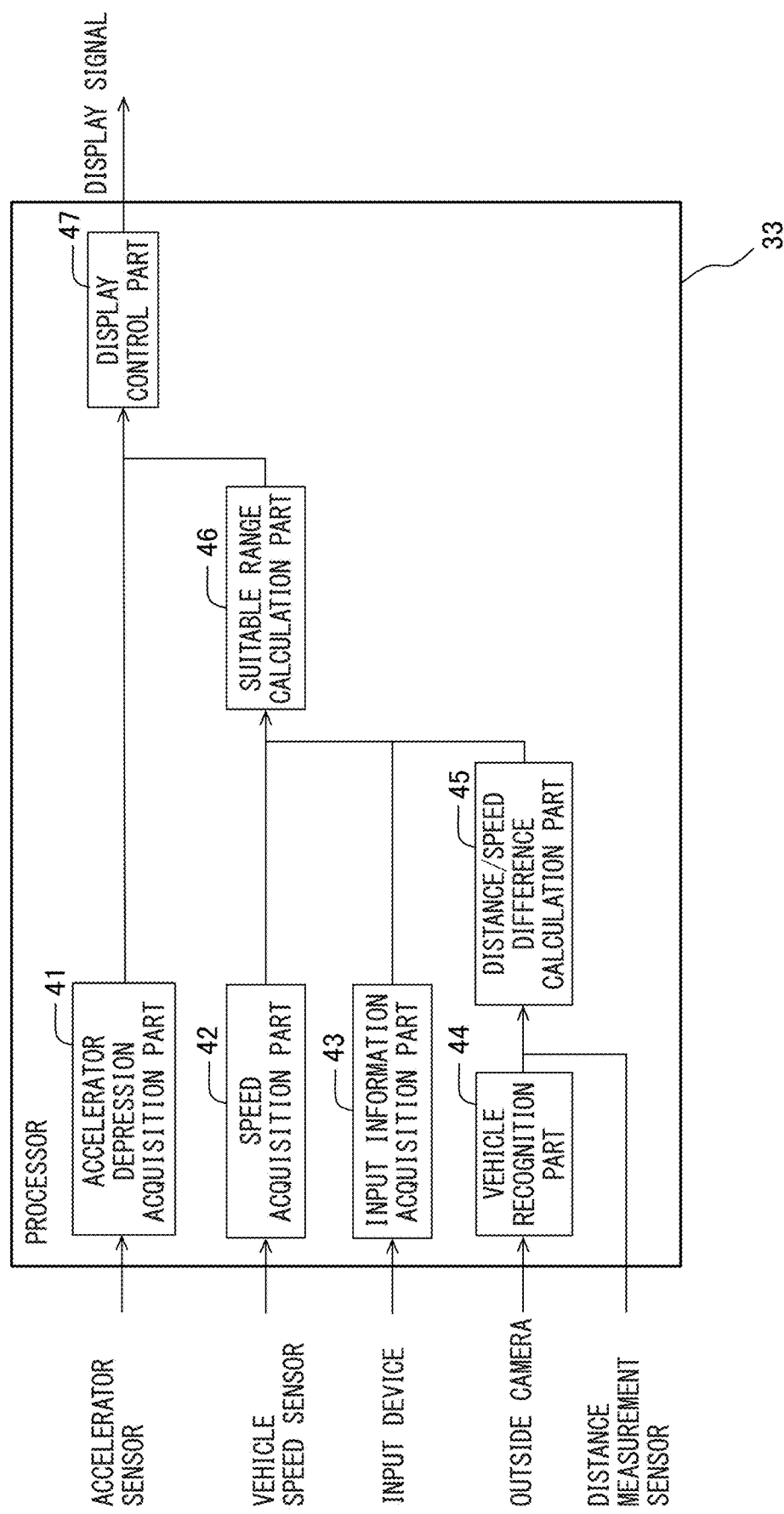
FIG. 5 is a functional block diagram of a processor of an ECU relating to display processing.

FIG. 5 is a functional block diagram of the processor 33 of the ECU 21 relating to display processing. The processor 33 is provided with an accelerator depression acquisition part 41, speed acquisition part 42, input information acquisition part 43, vehicle recognition part 44, distance/speed difference calculation part 45, suitable range calculation part 46, and display control part 47. These functional blocks of the processor 33, for example, are functional modules realized by a computer program operating on the processor 33. Alternatively, these functional blocks of the processor 33 may be dedicated processing circuits provided at the processor 33.

The accelerator depression acquisition part 41 acquires the current actual amount of accelerator depression from the accelerator sensor 11. The output of the accelerator sensor 11 is continuously input to the accelerator depression acquisition part 41. The accelerator depression acquisition part 41 outputs the acquired current amount of accelerator depression to the display control part 47.

The speed acquisition part 42 acquires the current speed of the vehicle 100 from the speed sensor 12. The output from the speed sensor 12 is continuously input to the speed acquisition part 42. The speed acquisition part 42 outputs the acquired current speed of the vehicle 100 to the suitable range calculation part 46.

The input information acquisition part 43 acquires information input by the driver or another passenger at the input device 15. The output from the input device 15 is input to the input information acquisition part 43, every time there is input at the input device 15. The input information acquisition part 43 outputs the acquired input information to the suitable range calculation part 46.

The vehicle recognition part 44 recognizes an object in the surroundings of the vehicle 100, in particular another vehicle running in the surroundings of the vehicle 100. For example, an image captured by the outside camera 13 is input to the vehicle recognition part 44. The vehicle recognition part 44 recognizes another vehicle captured in the input image by image recognition processing. As the image recognition processing, a neural network, support vector machine, or other known pattern recognition method is used. The vehicle recognition part 44 outputs the type of the other vehicle recognized and the position thereof in the image, etc., to the distance/speed difference calculation part 45.

The distance/speed difference calculation part 45 calculates the following distance and the speed difference with a preceding vehicle running in front of the vehicle 100 in the same lane as the vehicle 100. Information on the other vehicle in the surroundings of the vehicle 100 recognized by the vehicle recognition part 44 and the distance to an object in the surroundings of the vehicle 100 measured by the distance measurement sensor 14 are input to the distance/speed difference calculation part 45. The distance/speed difference calculation part 45 calculates the following distance between the vehicle 100 and a preceding vehicle, based on the information of the other vehicle and the distance to an object in the surroundings. In addition, the distance/speed difference calculation part 45 calculates the speed difference of the vehicle 100 and a preceding vehicle, based on the time-series information of the following distance between the vehicle 100 and a preceding vehicle. For example, when a preceding vehicle approaches the vehicle 100, it calculates the speed difference based on the speed by which the preceding vehicle approaches the vehicle 100. The distance/speed difference calculation part 45 outputs the calculated following distance with a preceding vehicle and speed difference with a preceding vehicle, to the suitable range calculation part 46.

The suitable range calculation part 46 calculates the suitable range of the amount of accelerator depression based on the current running state of the vehicle 100. Specifically, depending on the current running state of the vehicle 100, the suitable range calculation part 46 calculates, based on the following distance between the vehicle 100 and a preceding vehicle, the range of the amount of accelerator depression required for this following distance to become the target following distance, as the suitable depression range. In addition, depending on the current running state of the vehicle 100, the suitable range calculation part 46 calculates the range of the amount of accelerator depression required for the running speed of the vehicle 100 to be made the upper limit speed, as the corrected depression range, based on the current speed of the vehicle 100. The suitable depression range display 63 is shown on the display 20 so as to correspond to the suitable depression range calculated by the suitable range calculation part 46. The current speed of the vehicle 100 acquired by the speed acquisition part 42, the input information acquired by the input information acquisition part 43, the following distance with a preceding vehicle and the speed difference with a preceding vehicle calculated by the distance/speed difference calculation part 45 are input to the suitable range calculation part 46. In addition, the amount of accelerator depression may be input from the accelerator depression acquisition part 41 to the suitable range calculation part 46.

The suitable range calculation part 46 calculates the optimum amount of accelerator depression based on the current running state of the vehicle 100 and the width of the suitable depression range based on the current running state of the vehicle 100. Specifically, the suitable range calculation part 46 calculates the optimum amount of accelerator depression in the above way, based on the following distance with a preceding vehicle, the upper limit speed input at the input device and set by the driver, and the setting of the driver relating to the target following distance. In addition, the suitable range calculation part 46 calculates the width of the suitable depression range in the above way, based on the following distance with a preceding vehicle, the speed difference between the vehicle 100 and a preceding vehicle, and the speed of the vehicle 100. Further, the suitable range calculation part 46 may calculate the width of the suitable depression range in the above way, based on the amount of accelerator depression in addition to the following distance with a preceding vehicle, etc. The suitable range calculation part 46 outputs the suitable depression range having a width corresponding to the width of the suitable depression range calculated and centered on the calculated optimum amount of accelerator depression, to the display control part 47.

Figure 6:
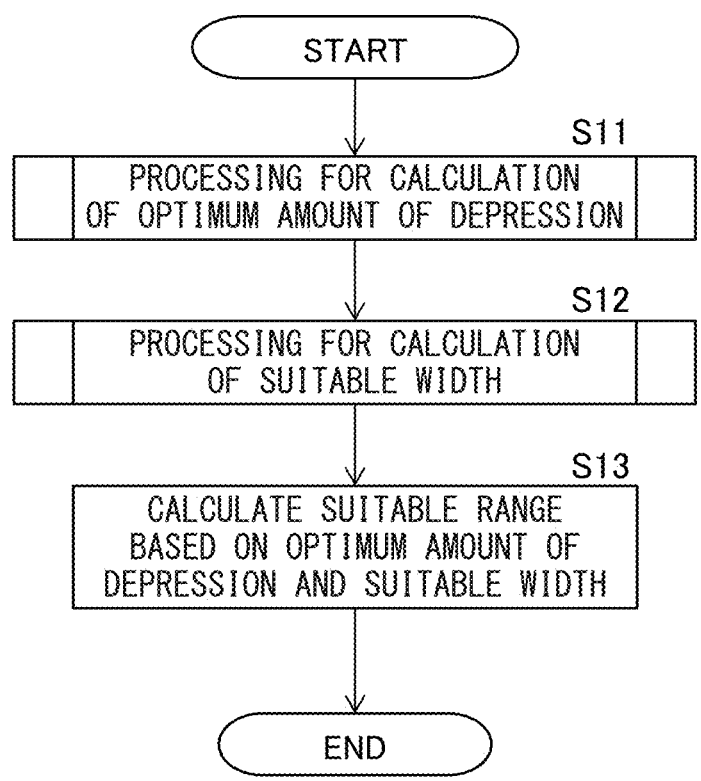
FIG. 6 is a flow chart of processing for calculating a suitable range, performed in a suitable range calculation part.

FIG. 6 is a flow chart of processing for calculating a suitable depression range performed in the suitable range calculation part 46. The illustrated processing is performed every certain time interval.

Figure 7:
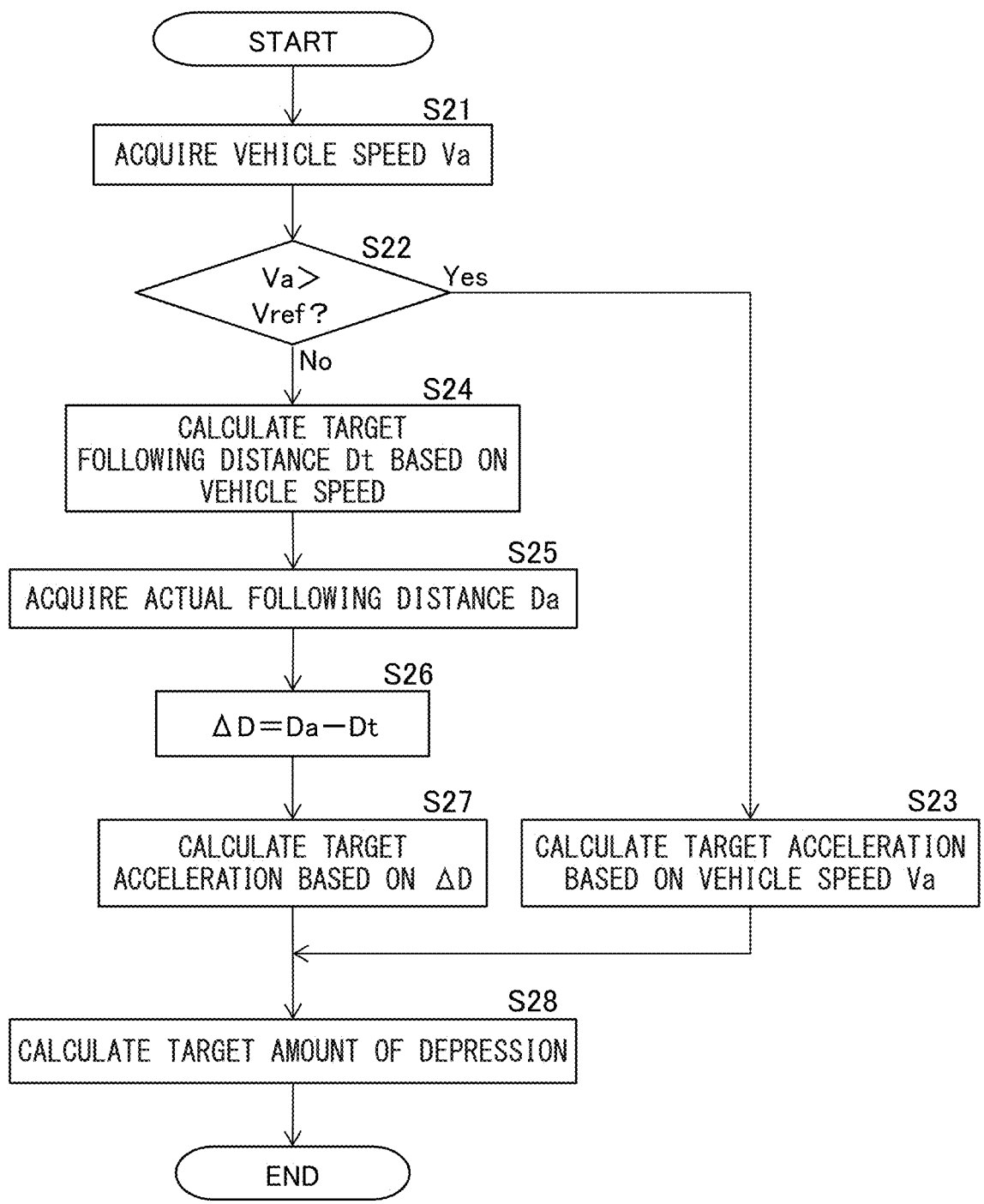
FIG. 7 is a flow chart of processing for calculating an optimum amount of depression performed at step S11 of FIG. 6.

As shown in FIG. 6, the suitable range calculation part 46 first calculates the optimum amount of accelerator depression by the processing for calculating the optimum amount of depression shown in FIG. 7 (step S11). Next, the suitable range calculation part 46 calculates the width of the suitable depression range by the processing for calculating the suitable width shown in FIG. 8 (step S12). Next, the suitable range calculation part 46 calculates the suitable depression range based on the optimum amount of accelerator depression calculated at step S11 and the width of the suitable depression range calculated at step S12 (step S13).

FIG. 7 is a flow chart of processing for calculating the optimum amount of depression performed at step S11 of FIG. 6. As shown in FIG. 7, in the processing for calculating the optimum amount of depression, the suitable range calculation part 46 first acquires the speed Va of the vehicle 100 (step S21). Next, the suitable range calculation part 46 judges if the speed Va of the vehicle 100 acquired at step S21 is faster than the upper limit speed Vref set in advance by the driver (step S22). If at step S22 it is judged that the speed Va of the vehicle 100 is faster than the upper limit speed Vref, the suitable range calculation part 46 calculates the target acceleration based on the speed Va so that the speed Va becomes the upper limit speed Vref after the elapse of a predetermined time (step S23), and calculates the optimum amount of depression based on the calculated target acceleration (step S28).

On the other hand, if at step S22 it is judged that the speed Va of the vehicle 100 is equal to or less than the upper limit speed Vref, the suitable range calculation part 46 calculates the target following distance Dt based on the speed Va and the setting of the following distance by the driver (step S24). Next, the suitable range calculation part 46 acquires the actual following distance Da from the distance/speed difference calculation part 45 (step S25), and calculates the difference ΔD between the target following distance Dt and the actual following distance Da (step S26) (ΔD=Da−Dt). After that, the suitable range calculation part 46 calculates the target acceleration, based on the difference ΔD of the following distance and the speed difference ΔV between the vehicle 100 and a preceding vehicle, by using the above formula (1) (step S27), and calculates the optimum amount of depression based on the target acceleration (step S28).

Figure 8:
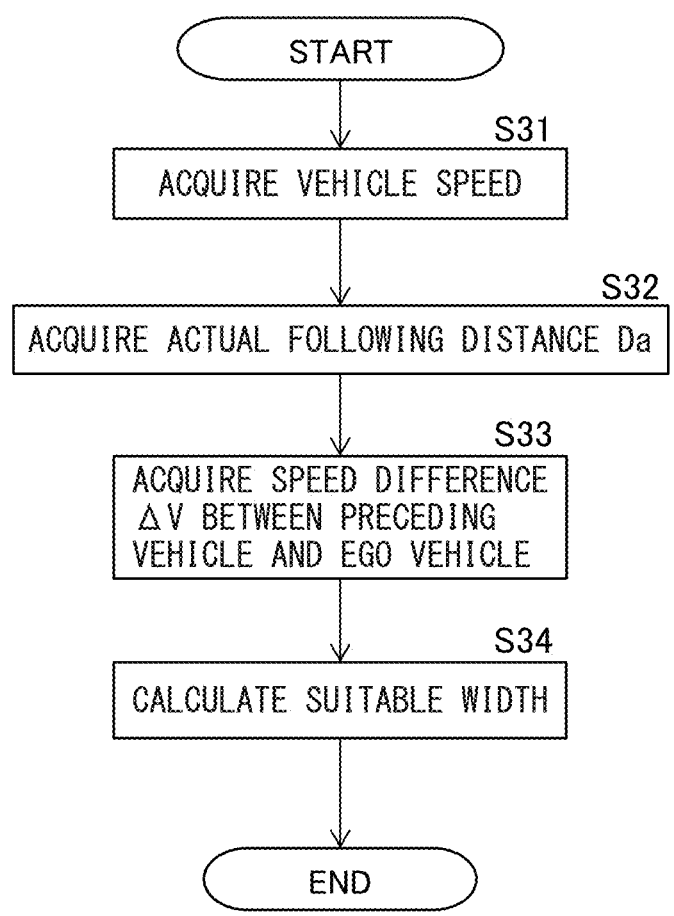
FIG. 8 is a flow chart of processing for calculating a suitable width performed at step S12 of FIG. 6.

FIG. 8 is a flow chart of processing for calculating the suitable width performed at step S12 of FIG. 6. As shown in FIG. 8, in the processing for calculating the suitable width, the suitable range calculation part 46 first acquires the speed Va of the vehicle 100 (step S31). Next, the suitable range calculation part 46 acquires the actual following distance Da from the distance/speed difference calculation part 45 (step S32). Further, it acquires the speed difference ΔV between the vehicle 100 and a preceding vehicle from the distance/speed difference calculation part 45 (step S33). After that, the suitable range calculation part 46 calculates the width of the suitable depression range based on the speed Va of the vehicle 100 acquired at step S31, the actual following distance Da, and the speed difference ΔV (step S34).

The display control part 47 outputs a display signal controlling the display object 60 of the display 20 to make the display 20 show the display object 60. In particular, the display control part 47 makes the display 20 show the current amount of accelerator depression and suitable depression range. Information relating to the current amount of accelerator depression is input from the accelerator depression acquisition part 41 to the display control part 47, and information relating to the optimum amount of accelerator depression and the width of the suitable depression range is input from the suitable range calculation part 46.

The display control part 47 generates a display signal showing the needle 62 on the display so as to indicate the current amount of accelerator depression. In addition, the display control part 47 generates a display signal making a display show the suitable depression range display 63 with the optimum amount of accelerator depression and width of suitable depression range calculated at the suitable range calculation part 46. The generated display signal is input to the display 20. At the display 20, the needle 62 and suitable depression range display 63 are shown in accordance with the display signal from the display control part 47.

Here, as explained above, the suitable depression range is calculated based on the following distance with a preceding vehicle (target acceleration calculated at step S27 of FIG. 7) or based on the speed of the vehicle 100 (target acceleration calculated at step S23 of FIG. 7). The display control part 47 changes the mode of display of the suitable depression range display 63 between when the suitable depression range is calculated based on the following distance with a preceding vehicle and when it is calculated based on the speed of the vehicle 100. Specifically, for example, the display control part 47 displays the suitable depression range display 63 in green when the suitable depression range was calculated based on the following distance with a preceding vehicle. On the other hand, the display control part 47 displays the suitable depression range display 63 in yellow when the suitable depression range was calculated based on the speed of the vehicle 100. By changing the mode of display of the suitable depression range display 63 in this way, the driver can obtain a grasp of for what reason the suitable depression range was set.

Advantageous Effects

In the present embodiment, on the display 20, a needle 62 showing the current amount of accelerator depression and a suitable depression range display 63 corresponding to the following distance with a preceding vehicle, are displayed. Therefore, even a driver with a low level of driving skill can easily obtain a grasp of the amount of accelerator depression required for maintaining a suitable following distance between the vehicle 100 and a preceding vehicle. As a result, the driver can maintain the following distance between the vehicle 100 and a preceding vehicle at a suitable interval.

Modifications

Figure 9:
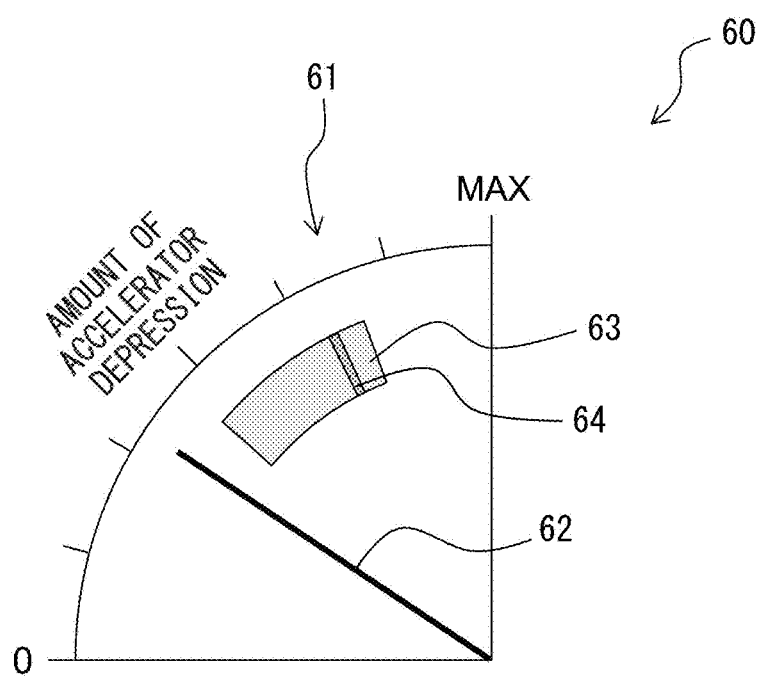
FIG. 9 is a view schematically showing an image displayed at part of a display.

In the above embodiment, on the display 20, a suitable depression range display 63 is shown, but the optimum amount of accelerator depression is not displayed. However, as shown in FIG. 9, on the display 20, the optimum accelerator depression display 64 may also be displayed in addition to the suitable depression range display 63. In this case, the optimum accelerator depression display 64 can be displayed in a mode different from the suitable depression range display 63 (for example, different color). Further, in this case, the suitable range calculation part 46 outputs information relating to the optimum amount of accelerator depression in addition to the suitable depression range to the display control part 47.

In the example shown in FIG. 9, the optimum accelerator depression display 64 is shown superposed on the suitable depression range display 63. However, the optimum accelerator depression display 64 may also be shown at a location different from the suitable depression range display 63 (without superposition).

Further, in the above embodiment, the suitable depression range is calculated as a range extending by exactly the width of the calculated suitable depression range centered about the calculated optimum amount of accelerator depression. However, the suitable depression range need not be a range centered about the calculated optimum amount of accelerator depression. As shown in FIG. 9, the optimum amount of accelerator depression may also be set so as to be a position different from the center of the suitable depression range. In this case, optimum accelerator depression display 64 is shown at a position different from the center of the suitable depression range display 63. Here, for example, when the suitable depression range is set based on the upper limit speed of the vehicle 100, if the actual amount of accelerator depression is larger than the optimum amount of accelerator depression, the state where the speed of the vehicle 100 is faster than the upper limit speed continues longer. Therefore, in such a case, as shown in FIG. 9, the suitable depression range is set so that the optimum amount of accelerator depression is positioned at the high speed side from the center of the suitable depression range.

In addition, in the above embodiment, the width of the suitable depression range is calculated using a table or calculation formula found in advance using the following distance with a preceding vehicle, the speed difference from a preceding vehicle, and the speed of the vehicle 100 as arguments. However, for example, it is also possible to calculate the upper limit value and lower limit value of the suitable depression range, by inputting a time different from the optimum amount of accelerator depression in the above-mentioned formula (1). Specifically, if, for example, entering 3 seconds for the time "t" of the formula (1) when calculating the optimum amount of accelerator depression, 2 seconds are entered for the time "t" of the formula (1) when calculating the upper limit value of the suitable depression range, and 4 seconds are entered for the time "t" of the formula (1) when calculating the lower limit value may be considered. In this case, the time "t" entered when calculating the upper limit value and lower limit value of the suitable depression range may be changed based on the following distance of the vehicle 100 and a preceding vehicle, a speed difference of the vehicle 100 and a preceding vehicle, the speed of the vehicle 100, etc.

Above, preferred embodiments according to the present invention were explained, but the present invention is not limited to these embodiments and can be corrected and changed in various ways within the language of the claims.

The invention claimed is:

1. A display control device comprising a processor, wherein
the processor is configured to:
acquire, from an acceleration sensor, a current amount of depression of an accelerator pedal;
calculate, as a calculated depression range, a range of an amount of accelerator depression required for a following distance of a preceding vehicle and an ego vehicle to become a predetermined target following distance, based on the following distance acquired through a camera or a distance measurement sensor;
calculate a width of the calculated depression range, based on at least one of the following distance between a preceding vehicle and the ego vehicle, a speed difference between the preceding vehicle and the ego vehicle, and a speed of the ego vehicle; and
display the current amount of depression and the calculated depression range at a display device able to be viewed by a driver.

2. The display control device according to claim 1, wherein the processor is configured to make the width of the calculated depression range narrower when the following distance between the preceding vehicle and the ego vehicle is relatively short, compared to when it is relatively long.

3. The display control device according to claim 1, wherein the processor is configured to make the width of the calculated depression range narrower when the speed difference between the preceding vehicle and the ego vehicle is relatively large, compared to when it is relatively small.

4. The display control device according to claim 1, wherein the processor is configured to make the width of the calculated depression range narrower when the speed of the ego vehicle is faster than a predetermined upper reference speed, compared to when the speed of the ego vehicle is equal to or less than an upper reference speed.

5. The display control device according to claim 1, wherein the processor is configured to make the width of the calculated depression range narrower when the speed of the ego vehicle is slower than a predetermined lower reference speed, compared to when the speed of the ego vehicle is equal to or greater than the lower reference speed.

6. The display control device according to claim 1, wherein
the processor is configured to calculate the calculated depression range based on the upper limit speed, if the speed of the ego vehicle exceeds a predetermined upper limit speed or if the speed of the ego vehicle is expected to exceed a predetermined upper limit speed when the accelerator pedal is depressed by an amount of accelerator depression in a calculated depression range calculated based on the following distance between the preceding vehicle and the ego vehicle, and
the processor is configured to change the mode of display of the calculated depression range on the display device between when the calculated depression range is calculated based on the following distance and when it is calculated based on the upper limit speed.

7. The display control device according to claim 1, wherein
the processor is configured to calculate desired amount of accelerator depression for the following distance between the preceding vehicle and the ego vehicle to become the target following distance, based on the following distance, and
the processor is configured to make the display device display the current amount of accelerator depression, the desired amount of accelerator depression, and the calculated depression range.

8. The display control device according to claim 7, wherein the processor is configured to display the desired amount of accelerator depression at a position different from the center of the calculated depression range.

* * * * *